US007828010B2

(12) United States Patent
Diesing et al.

(10) Patent No.: US 7,828,010 B2
(45) Date of Patent: Nov. 9, 2010

(54) PRESSURE REGULATOR FOR A FUEL SUPPLY UNIT AND METHOD FOR PRODUCTION OF A PRESSURE REGULATOR

(75) Inventors: Detlev Diesing, Hattershelm (DE); Karl Eck, Frankfurt (DE); René Schmid, Frankfurt am Main (DE)

(73) Assignee: Continental Automotive GmbH, Hännover (DE)

( * ) Notice: Subject to any disclaimer, the term of this patent is extended or adjusted under 35 U.S.C. 154(b) by 653 days.

(21) Appl. No.: 11/664,122

(22) PCT Filed: Sep. 14, 2005

(86) PCT No.: PCT/EP2005/054560

§ 371 (c)(1),
(2), (4) Date: Mar. 30, 2007

(87) PCT Pub. No.: WO2006/037712

PCT Pub. Date: Apr. 13, 2006

(65) Prior Publication Data

US 2008/0053534 A1 Mar. 6, 2008

(30) Foreign Application Priority Data

Oct. 1, 2004 (DE) ....................... 10 2004 048 392

(51) Int. Cl.
*G05D 16/10* (2006.01)
*F16K 27/10* (2006.01)

(52) U.S. Cl. ....................................... 137/508; 137/510

(58) Field of Classification Search .............. 137/15.19, 137/508, 509, 510
See application file for complete search history.

(56) References Cited

U.S. PATENT DOCUMENTS

| | | | | |
|---|---|---|---|---|
| 2,447,695 | A * | 8/1948 | Folke | 137/510 |
| 3,971,409 | A * | 7/1976 | Bauer | 137/613 |
| 5,842,455 | A | 12/1998 | Tuckey et al. | |
| 5,932,857 | A * | 8/1999 | Stander et al. | 200/83 B |
| 6,006,781 | A * | 12/1999 | Brandt et al. | 137/493.6 |
| 6,432,307 | B2 * | 8/2002 | Gizowski et al. | 210/321.6 |
| 6,619,314 | B2 | 9/2003 | Wynn, Jr. et al. | |

FOREIGN PATENT DOCUMENTS

DE 195 08 637 A1 9/1996

(Continued)

OTHER PUBLICATIONS

Chen Minyao Mao Fengyin Li Kebin; Xiang Qun; Application of Polyphenylene Sulfide; date: Jun. 17, 2003; pp. 18-21; vol. 17; paragraph 2.5. "Application of polyphenylene sulfide in automobile field"; publisher: University of Technology, Nanjing, China, Abstract only is translated.

*Primary Examiner*—Stephen Hepperle
(74) *Attorney, Agent, or Firm*—Cohen Pontani Lieberman & Pavane LLP

(57) ABSTRACT

Disclosed is a pressure regulator for a fuel supply unit of a motor vehicle and method for production of a pressure regulator. The pressure regulator comprises a valve for producing a joining of a connection to an outlet above a designated pressure in the connection, a movable piston and a membrane, which is held on a fixed annular element, for sealing the piston in relation to the annular element, characterized in that the membrane is welded to the annular element.

8 Claims, 2 Drawing Sheets

FOREIGN PATENT DOCUMENTS

| | | | |
|---|---|---|---|
| DE | 297 16 309 | U1 | 1/1998 |
| DE | 197 46 763 | A1 | 5/1999 |
| DE | 198 14 298 | A1 | 10/1999 |
| JP | 2000034762 | A | 2/2000 |
| JP | 2002286146 | A | 10/2002 |
| JP | 2003262282 | A | 9/2003 |

* cited by examiner

PRESSURE REGULATOR FOR A FUEL SUPPLY UNIT AND METHOD FOR PRODUCTION OF A PRESSURE REGULATOR

BACKGROUND OF THE INVENTION

Pressure regulator for a fuel supply unit and method for production of a pressure regulator The invention relates to a pressure regulator for a fuel supply unit of a motor vehicle, with a valve for producing a joining of a connection to an outlet above a designated pressure in the connection, with a movable piston and with a membrane, which is held on a fixed annular element, for sealing the piston in relation to the annular element. Furthermore, the invention relates to a method for production of a pressure regulator for a fuel supply unit of a motor vehicle, in which a piston of a valve is joined to a fixed annular element in a sealing manner via a membrane.

Pressure regulators of this type are frequently used in motor vehicles today to regulate a pressure in a forward flow line leading to an internal combustion engine, and are known from practice. The membrane is clamped between two annular elements of the housing and separates the region above the piston from the region below the piston. The connection opens into the region below the piston. The required tensioning force of the membrane is generally produced by flanging an edge of the annular element.

A drawback of the known pressure regulator is that the sealing of the membrane is insufficient, in particular in the temperature range below 0° C., in order to keep the designated pressure at which the pressure regulator is to open within an exacting tolerance range. The pressure regulator may frequently fail completely due to leakages at the outer edge.

The invention is based on the problem of developing a pressure regulator of the type mentioned at the beginning in such a manner that reliable tightness between the membrane and the annular element is ensured. Furthermore, the invention is based on the problem of designing a method for production of the pressure regulator in such a manner that it ensures particularly reliable sealing of the membrane in relation to the annular element.

BRIEF DESCRIPTION OF THE INVENTION

The problem mentioned first is solved according to the invention in that the membrane is welded to the annular element.

This design enables the membrane to be joined to the annular element with a cohesive material joint. This ensures reliable tightness in particular in the temperature range below 0° C. Settling gaps between the membrane and the annular element, which may result in leakages after a certain operating time of the pressure regulator according to the invention, are likewise reliably avoided. This ensures reliable tightness between the membrane and the annular element.

In the case of a pressure regulator according to the invention and designed as a throughflow valve, the tightness between the region below the piston and the region above the piston can be further increased if the membrane is welded to the piston.

Flow through the piston above the designated pressure can be ensured in a simple manner, according to another advantageous development of the invention, if the membrane has a recess for a valve seat arranged in the piston.

Welding the membrane to the piston and the annular element turns out to be particularly cost-effective, according to another advantageous development of the invention, if the annular element and the piston are manufactured from plastic.

Permanent tightness of the welded joint is ensured, according to another advantageous development of the invention, if the plastic of the membrane, the piston and the annular element is polyphenylene sulfide.

According to another advantageous development of the invention, the membrane, the annular element and the piston have a particularly high degree of stability if the plastic has inserts of glass fibers.

The welded joint of the membrane can be produced particularly cost-effectively, according to another advantageous development of the invention, if the membrane or the component to be welded to the membrane is manufactured from a material permeable to a laser beam and the respectively other component is manufactured from a material impermeable to a laser beam. This design enables the membrane to be welded by means of the laser beam. This results in particularly low manufacturing costs in particular in series manufacturing of the pressure regulator according to the invention. In addition, the manufacturing can be automated.

The annular element could be, for example, an edge of a housing guiding the piston. However, in order to set the prestressing force of the spring element against the piston, the housing of the pressure regulator according to the invention is preferably manufactured from an easily plastically deformable material. According to another advantageous development of the invention, the housing can be manufactured from an easily deformable steel sheet and the membrane from plastic if the annular element is clamped in a housing in a sealing manner.

The problem mentioned second, namely the provision of a method for production of the pressure regulator with particularly reliable sealing of the membrane in relation to the annular element, is solved according to the invention in that the membrane is welded to the annular element.

By this means, settling gaps which arise during the flanging operation, as in the case of the known annular element, are reliably avoided. Owing to the invention, the membrane is joined to the annular element with a cohesive material joint. This leads to particularly reliable sealing of the membrane in relation to the annular element in particular in the range below 0° C. In the case of a pressure regulator designed as a straightway valve, the piston can be welded to the membrane in an analogous manner.

According to an advantageous development of the invention, the method according to the invention turns out to be particularly cost-effective if the welding takes place by a laser welding technique.

BRIEF DESCRIPTION OF THE DRAWINGS

The invention permits numerous embodiments. To further clarify its basic principle, two of these are illustrated in the drawing and will be described below. In the drawing

DETAILED DESCRIPTION OF THE INVENTION

Figure 1:
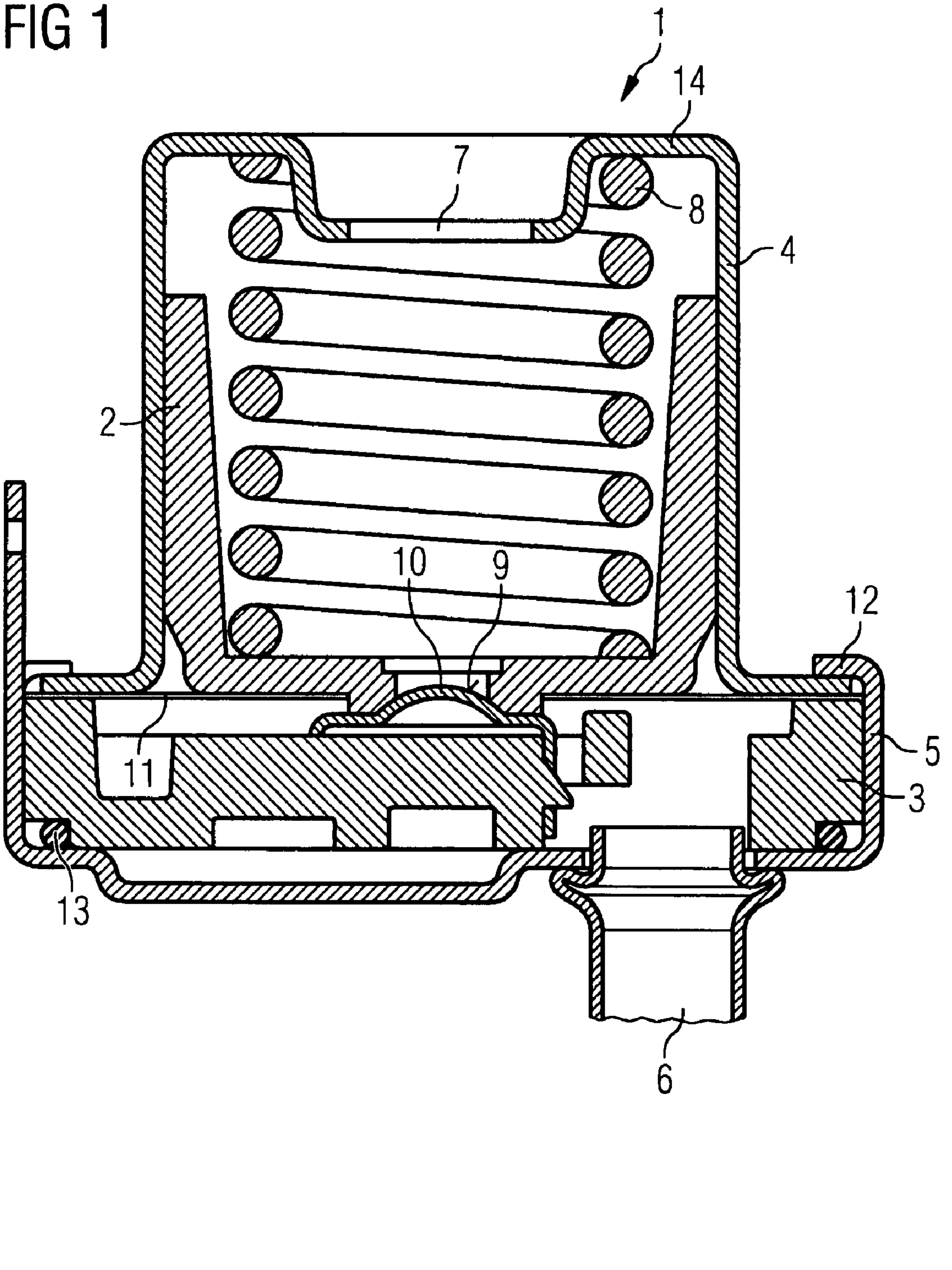
FIG. 1 shows a longitudinal section through a pressure regulator according to the invention and designed as a throughflow valve.

FIG. 1 shows a pressure regulator according to the invention and designed as a throughflow valve with a housing 1 and a piston 2 arranged displaceably in the housing 1. The pressure regulator serves to limit a maximum pressure in a forward flow line (not illustrated) of a fuel tank of a motor vehicle. The housing 1 has two housing parts 4, 5 which are kept at a distance by an annular element 3. The pressure regulator has a connection 6 for a pressure line, and an outlet 7. The piston 2 is prestressed with a valve seat 9 against a valve body 10 by means of a spring 8 designed as a spiral spring.

A membrane 11 joined to the annular element 3 and the piston 2 seals the region below the piston 2 from the region above the piston 2. This ensures that, at a pressure in the connection 6, the piston 2 is loaded counter to the force of the spring 8 and, above a designated pressure, the piston 2 is moved such that the valve seat 9 lifts off from the valve body 10. Above the designated pressure, fuel from the connection 6 can therefore escape through the outlet 7. The housing parts 4, 5 are manufactured from steel sheet and are joined to each other by flanging 12. The flanging 12 prestresses a sealing ring 13 between the annular element 3 and the lower housing part 5. An edge 14 of the upper housing part 4, which edge holds the spring 8, is of plastically deformable design and serves to calibrate the pressure regulator and therefore to set to the designated pressure at which the join between the connection 6 and the outlet 7 is produced. The annular element 3, the piston 2 and the membrane 11 are manufactured from the plastic polyphenylene sulfide. The membrane 11 is joined to the annular element 3 and the piston 2 by a laser welding technique.

Figure 2:
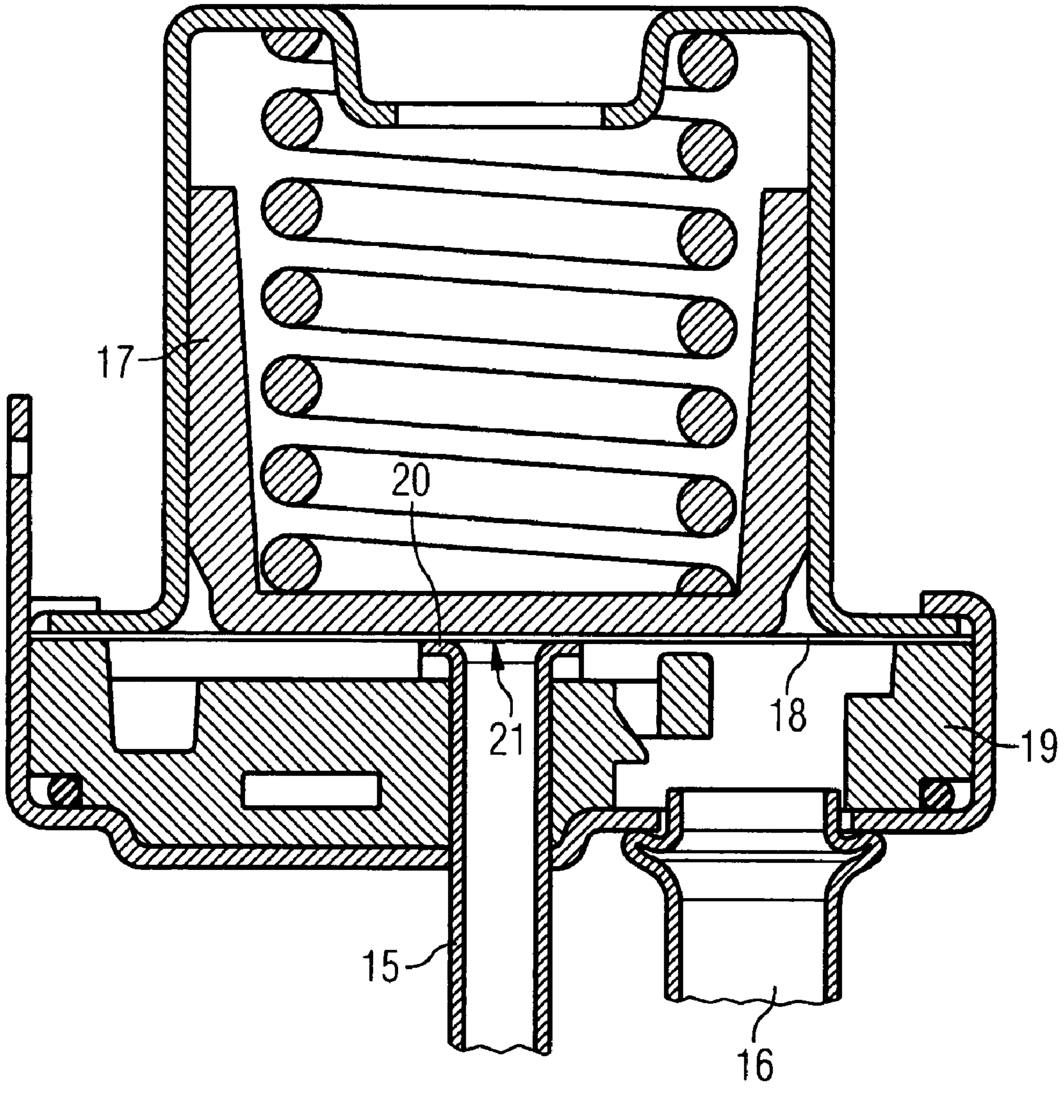
FIG. 2 shows a longitudinal section through a pressure regulator designed as a cutoff valve.

FIG. 2 shows a pressure regulator designed as a cutoff valve. Said pressure regulator differs from that from FIG. 1 in particular by an outlet 15 being arranged on the same side as a connection 16, as seen from a piston 17. A membrane 18 is welded to an annular element 19 exclusively in the radially outer region and covers the entire cross section of the piston 17. Furthermore, the membrane 18 forms a valve body 21 bearing against a valve seat 20 of the outlet 15. At a designated pressure in the connection 16, the piston 17 and the membrane 18 are pressed away from the valve seat 20 of the outlet 15 such that fuel can flow from the connection 16 to the outlet 15.

The invention claimed is:

1. A pressure regulator for a fuel supply unit of a motor vehicle, comprising:

a fixed annular element;

a housing including:

a first housing portion; and a second housing portion, the second housing portion being attached to the first housing portion, the housing configured to retain the annular ring between the first and second housing portions;

an inlet on the housing;

an outlet on the housing;

a valve for producing connection between the inlet and outlet above a designated pressure in the inlet;

a movable piston arranged in one of the first and second housing portions; and a membrane that is welded to the fixed annular element and configured to seal the piston in relation to the annular element, wherein one of the membrane and the fixed annular ring is manufactured from a material permeable to a laser beam and the other of the membrane and the fixed annular ring is manufactured from a material impermeable to the laser beam.

2. The pressure regulator as claimed in claim 1, wherein the membrane is welded to the moveable piston.

3. The pressure regulator as claimed in claim 1, wherein the membrane has a recess for a valve seat arranged in the piston.

4. The pressure regulator as claimed in claim 1, wherein the annular element, the membrane, and the piston are manufactured from plastic.

5. The pressure regulator as claimed in claim 4, wherein the plastic of the membrane, the piston and the annular element is polyphenylene sulfide.

6. The pressure regulator as claimed in claim 4, wherein the plastic has inserts of glass fibers.

7. The pressure regulator as claimed in claim 1, wherein the annular element is sealing clamped with respect to at least one of the first and second housing portions.

8. The pressure regulator as claimed in claim 1, characterized in that the welding takes place by a laser welding technique.

* * * * *